United States Patent Office 3,296,444
Patented Jan. 3, 1967

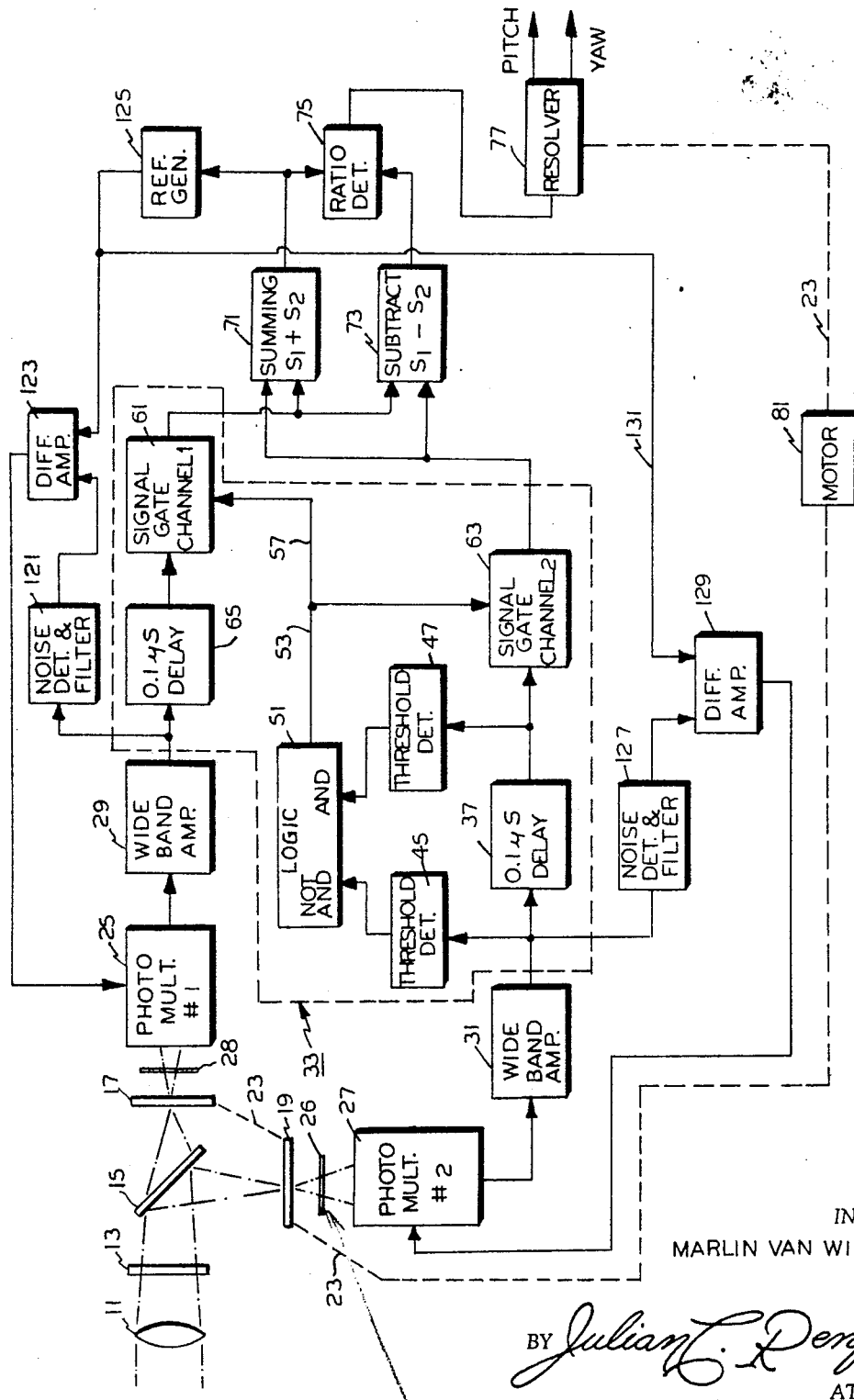

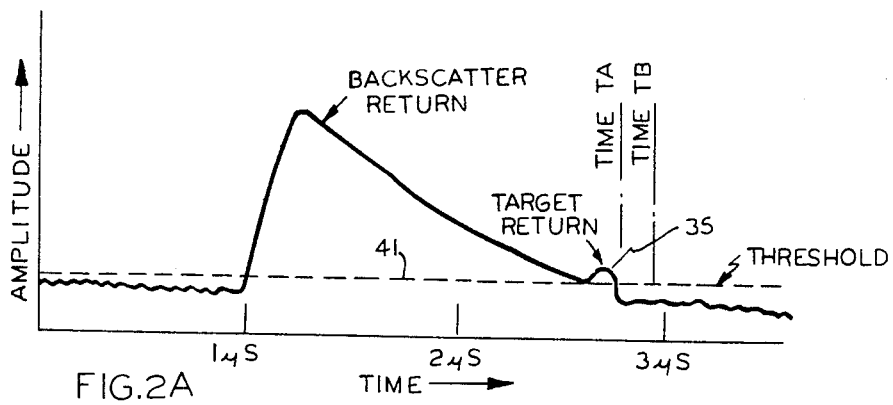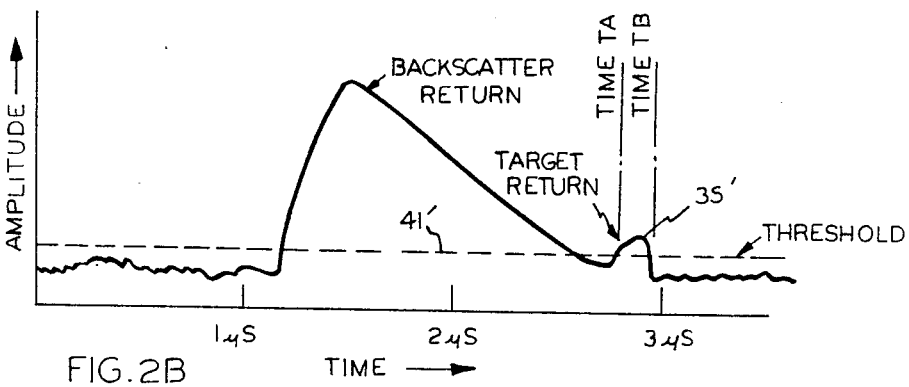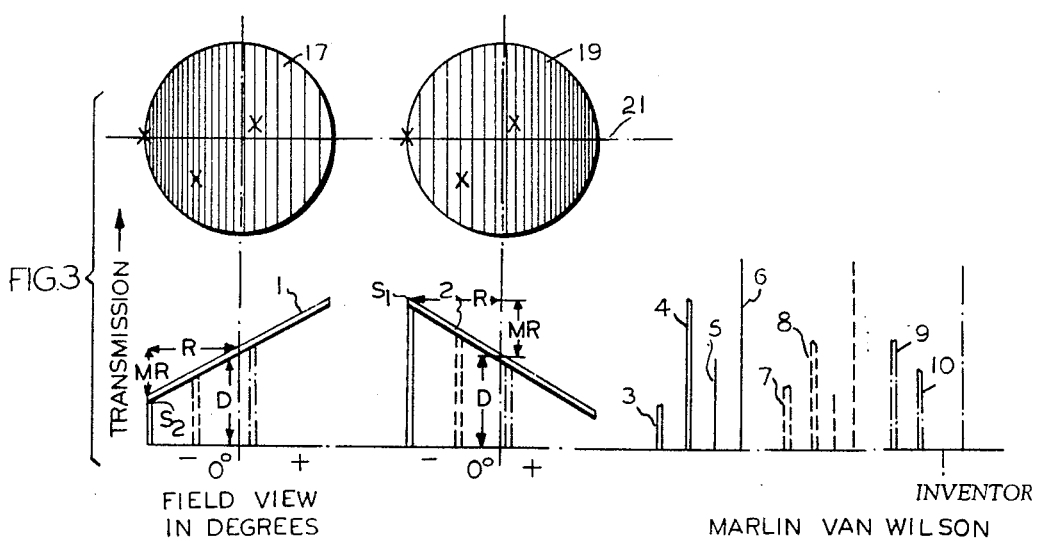

3,296,444
OPTICAL TARGET SENSING DEVICE USING
VARIABLE DENSITY FILTERS
Marlin Van Wilson, Orange County, Fla., assignor to
Martin-Marietta Corporation, Middle River, Md., a
corporation of Maryland
Filed Aug. 2, 1963, Ser. No. 299,627
19 Claims. (Cl. 250—203)

This invention relates to a method and apparatus capable of locating a pulsing source of light or the like and supplying electrical outputs denoting the angular position thereof in two dimensions, and more particularly to a target locator adapted for anti-tank missile guidance as well as space probes which has the ability to avoid the false signal characteristics of backscatter in case the pulsing source is actually the reflection from a target body of a beam from a remote illuminating source of pulsing light.

In the past, many target seeking devices have been proposed and come into widespread use. However, all known devices of this type have suffered from inaccuracies when the target is illuminated from the short, powerful burst of illumination that may be provided by a laser beam. This is to say, with the advent of the laser as an illumination source, many of the prior art devices have been rendered incompatible in that the extremely short time that the target information is available and the non-repetitive nature of the signal prohibits the use of standard chopping and filtering devices of the present art.

In accordance with the present invention, light from passive objects, occasioned by reflection produced by a pulsed illuminating source, is measured relative to orthogonal axes to provide co-ordinate information. Homing signals or the like may be derived from this information and used for pitch and yaw correction to guide a missile or other vehicle to the object sensed.

While navigational aids, satellites, planets or other target objects may be regarded as the passive object sought, the invention will be particularly described in connection with its application for guiding a missile to home on target reflection, in spite of large amounts of atmospheric or other backscatter.

In all embodiments of the invention, the received reflected light is variably attenuated proportionally to a co-ordinate representation of position relative to a first axis. The received reflected light is also variably attenuated proportionally to position relative to a second axis orthogonal to the first axis. Positional information is subsequently derived from the so-attenuated light energy. The light energy is converted to electrical energy used for computational purposes to provide, for example, output heading corrective signals.

In general, the received reflected light may be actually split into a plurality of paths where it is exposed to light transmissive elements having predetermined, related light transmissive characteristics. These elements attenuate the light in accordance with the incident position of the received light relative to the orthogonal axes.

One embodiment employs only a pair of light transmissive elements, in the form of graded filters, having opposite transmissive characteristics relative to a sensitive axis. The variably attenuated light energy passing the filters is converted to electrical energy which is discriminated to determine a measure of the target return magnitudes relative to the co-ordinate displacement along the common axis.

The same type information is also obtained from the same or additional light transmissive elements having their characteristics also oriented oppositely but along an axis orthogonal to the common axis to yield co-ordinate information relative to such orthogonal axis. The information obtained from both camparisons is sufficient to generate pitch and yaw corrections.

When the target information appears at the center of the orthogonal axes (the homing position), the difference of the signal amplitudes following the respective paths is zero, which condition produces a zero correction output. Any other position of received target incident light will affect associated pairs of paths oppositely at the time of its appearance and the difference of resulting signal magnitudes is a co-ordinate off-center indication.

One suitable source for supplying the light energy is a pulsed laser beam wherein the illuminating pulse duration may be of the order of 0.1 microseconds or less, concentrated to hit the target, preferably without overlapping into the background and the optical power is concentrated within the pass band of the seeker optics.

Complete pitch and yaw information may be derived from a single pulse provided that sufficient paths are employed to enable a determination of the proper quadrant, as well as co-ordinate designations. Alternatively, a pair of paths may be employed with a first pulse determining, for example, a measure of pitch, as outlined. The light transmissive elements are then rotated so that their sensitive axis is normal to the position of their sensitive axis during the first pulse to permit a second target return pulse to yield information relative to a measure of yaw or its correction.

A feature of the invention resides in the straightforward principle permitting the use of a simple computing section capable of resolving the ratio $X-Y/X+Y$ to solve for co-ordinates where the X and Y measures are developed as a result of the position or modulation.

As therefore will be apparent, by controlling the speed of rotation of the graded filters so that approximately one-fourth revolution of the filters occurs per illuminating pulse, both pitch and yaw information for example can be obtained in such a two-channel system. Actually, it is desirable for one or more revolutions of the graded filters to take place between illuminating pulses, in the interest of avoiding problems in automatic gain control. This is because the variable attenuation of the background radiation for both channels is integrated out to the same levels, which would not be the case if the filters merely rotated 90° between pulses. By the use of oppositely phased rotating graded filters, the target signal will be of the same magnitude of intensity after passing through the filters only if the target is on the boresight of the seeker. If the target is off boresight in the direction of the graded filter symmetry axis, the light received from the target after passing through the graded filters will be attenuated differently, or in other words, have different magnitude in the two channels.

Accordingly, I provide means for measuring the difference in the amount of target illumination received in the two-channel arrangement. I use a sum and difference ratio calculator to determine the distance and direction along the graded filter sensitive axes the target lies from boresight, this of course being made possible by the basic fact that the target energy in one channel when off boresight is attenuated by the dark, low transmission portion of one graded filter while at the same instant the respective portion of the remaining filter, being a lightly shaded, higher transmission area, causes the target signal magnitude in the other channel to be greater. Knowing the whereabouts of the graded filters sensitive axes and the magnitude of the target angle off boresight in this direction gives a unique one-dimension target location. By the rotation of the graded filters to a position approximately 90° from the preceding in anticipation of the next illuminating pulse, target location information orthogonal to that derived from the first pulse is achieved on reception of the second pulse thus producing two dimensional target information for each pair of illuminating pulses.

A further feature of the invention resides in the provision of an automatic gain control arrangement for insuring that the amplitude ratio of the variably attenuated pulses is not distorted after the attenuation step. Such a gain control loop may consist of means for developing a D.C. voltage proportional to the rectified level of the noise energy and differentially comparing this with a constant reference voltage for controlling the gain of the light to electrical converter apparatus. Since the ambient light input to all light to electrical converters should be the same, the varying of their respective gains to cause equal noise outputs will cause all channels to have an equal gain for both ambient and signal light inputs.

Further, the reference voltage is supplied at a preset threshold value, so long as the summing of the signal magnitudes from all channels is less than the preset value. However when the threshold value is attained, the voltage is lowered a proportional amount, reducing the gain of the channels because the missile is closing in on the target and saturation of the components, such as, the light to electrical converters and pulse amplifiers is thus avoided.

A still further feature permits target return selection from backscatter or background noise by comparing the composite energy to itself when delayed by a time interval to correspond to the transmitted pulse width by providing a gating control arrangement for signal separation.

Another embodiment of the invention employs three channels for developing pitch and yaw corrective signals from a single light pulse. Two graded light filters, oriented at 90° to one another, are utilized along with a third ungraded (uniform attenuation) filter, the latter of which supplies a reference level for comparison with the signal levels derived from the orthogonal filters for developing the required information.

Also, three channels may be employed with three identical graded filters arranged with their sensitive axes 120° apart. Consideration of all three channel outputs collectively provides orthogonal components for developing the pitch and yaw corrective signals. The arrangement is also compatible with the principle that the signal strengths will still cancel out without affecting the displacement measurement.

The principles of operation of the invention will be described in connection with seeker apparatus capable of one complete azimuth elevation signal for each two transmitted light pulses.

With the foregoing in mind, it is a primary object of my invention to provide an arrangement for homing on the reflection of an optically illuminated target in spite of large amounts of backscatter.

Another object of my invention is to provide an automatic homing arrangement operable from received reflected light for generating both pitch and yaw corrective signals.

Still another object is the provision of such apparatus wherein there is no requirement to know distances and the target or object homed upon may be entirely passive.

It is a further object of the invention to avoid the apparatus normally associated with the use of centroid or nutation principles for a homing system, while offering the advantages of a substantially continuous seeking arrangement.

A further object of the invention is the provision of an apparatus capable of deriving positional information from a single energy pulse by variably attenuating the target return oppositely relative to orthogonal axes and comparing the attenuated energy.

It is a still further object of the invention to derive information from the subject apparatus by comparing variably attenuated returns passed through the same or similar light attenuating elements effective along orthogonal axes.

A still further object of the invention is the provision of a novel signal discriminating apparatus for selecting energy in accordance with that produced by target return or by return from the target area.

It is yet another object of the invention to provide a novel automatic gain control arrangement wherein essentially the noise energy is detected and differentially compared with a reference signal to generate a gain control voltage for application to the light to electrical energy converter or photo-multiplier for each channel.

It is a yet further object to provide a system capable of following a beam composed of backscatter only, during the existence of same, in a stable manner even when a tangible target does not exist on which the illuminating beam can strike and terminate, this to be utilized by a deep space probe guided from the earth; and though the illuminating beam has no concrete target on which to impinge in outer space, the small amount of dust and other matter throughout space causes sufficient backscatter signal to cause a forward-looking vehicle to properly steer a desired course.

It is yet another object of the present invention to provide sum and difference signals developed from incident reflected light, for comparison purposes.

The foregoing description will now be amplified and detailed in connection with a specific application of the invention as depicted in the drawings, wherein:

FIG. 1 is a schematic block type arrangement illustrating the overall principle of operation.

FIGS. 2A and 2B show typical backscatter and target return energy relative to time with the energy of FIG. 2B being delayed to enable a gating opertion to discriminate between the noise and target return energy, and;

FIG. 3 shows a pair of light transmissive elements having opposite characteristics relative to a common axis; along with typical output pulse magnitudes produced by the impingement of reflected target light at various locations upon the light transmissive elements, subsequently discriminated out as signal energy magnitudes.

Referring now to FIG. 1, it may be seen that the light from the scene is collected by a refracting lens 11 and directed through an optical filter 13 to a half-silvered mirror 15. The mirror 15 splits the incoming light into two equal components which follow separate paths or channels throughout the remainder of the diagram. Each of these light components is brought into focus in the plane of a separate graded filter, shown as filter No. 1 at 17 and filter No. 2 at 19. The graded or variable density filters are one form of light transmissive element which may have a linear light transmissive characteristic apparent along a single axis. Graded filters having non-linear characteristics are also useful, particularly for variable gain vs. angle outputs with improved boresight resolution.

The graded filters 17 and 19 are depicted in the form of circular discs having dimensions larger than the full field of view of image size. From FIG. 3 it will be seen that the light transmission characteristics varies in a near linear manner across the diameters of the filters 17 and 19 along a common axis 21 corresponding to the respective sensitive axes of the filters.

It may also be noted from the shading appearing on this drawing and the correspondingly associated light transmission characteristics 1 and 2, that the filters 17 and 19 are oriented oppositely to each other along the common axis 21.

They are preferably mounted on rotating centerless bearings in the focal plane of the collecting lens 11 (FIG. 1) such that the direction of increasing transmission with respect to the image is 180° apart. Therefore it may be appreciated that a portion of the object that is displaced from the boresight in a direction along the graded filter sensitive axes, will pass through one of the filters in a low transmission portion and through the other in a higher transmission portion. Thus, the respective incoming energy, which may include both noise and signal energy, is amplitude attenuated as a function of the object position relative to the optical axis.

Using only the pair of pathways provided by the illustrative showing of FIG. 1, the two graded filters measure target position in one dimension only, and then only periodically, as signal return or return from the signal area occurs during the pulsed interval emitted by the illuminator (not shown), but which may comprise a suitable pulsed laser source.

Since two dimensional information is needed for a homing system, the same light transmissive elements 17 and 19 may be employed for use with alternate pulses to produce orthogonal positional information, provided that their sensitive axis, such as shown in FIG. 3 at 21, is oriented perpendicularly during the second pulse reception period to its position during the first pulse. For an automatic system, the filters 17 and 19 may be rotated by a common driving connection as shown by the dotted line 23, together at a speed of $(R+\frac{1}{4})N$, wherein N is the pulse repetition rate and the rotational speed is calculated in revolutions per second. R is the number of completed revolutions between pulses and can be any integer including zero. Thus, it will be appreciated that the sensitive axis is caused merely to walk forward 90°, for each pulse, to produce orthogonal information by alternate pulses.

In FIG. 3, the substantially linear light transmissive characteristic of graded filter 17 is indicated by the sloping graphed line 1, wherein the light transmissivity is plotted along the ordinate and the filed view, in degrees, along the abscissa, from 0° in a negative direction for the left hand semi-circular portion of filter 17 and from 0° in the positive direction for the right hand moiety. The light transmissive characteristic for filter 19 is shown at 2 as having an equal and opposite slope to that of filter 17 when they are alined, with their sensitive axes falling on common axis 21.

The effect of a target return having a maximum negative value relative to filter 17, is determined from the left handmost X's depicted on filters 17 and 19. The effect of such a target return position is to provide light signal amplitude 3 for channel 1 via filter 17 and light signal amplitude 4 for channel 2 via filter 19. These amplitudes are projected to the right in FIG. 3 and their sum and difference values drawn, as indicated by the lines 5 and 6 respectively. Similarly, the next most left hand positioned target return signals 7 and 8 are plotted, as are also the signal return magnitudes 9 and 10 for the X's appearing in the positive halves of the filters 17 and 19.

From FIG. 3 the use of the modulated signals for producing seeker outputs may now be explained in connection with the simple and straight forward mathematical development of transmission magnitude relative to field view in degrees. Consider the following definitions:

R=degrees off boresight in sensitive axis.
D=transmission at 0°.
M=transmission characteristic slope=$dT/dR$.
T=transmission=$D+MR$.

Then:

P=input signal to both filters.
$P(D+MR)$=output #1=$S_1$=pulse height #1.
$P(D-MR)=S_2$=pulse height #2.
$S_2=(S_1/D+MR)(D-MR)=S_1D-S_1MR/D+MR$.
$S_2D+S_2MR=S_1D-S_1MR$.
$R=D/M(S_1-S_2)/(S_1+S_2)$.

This mathematical relationship of course holds true when the sensitive axis of the filters are rotated to the orthogonal position to develop a measure of degrees off boresight, along such orthogonal axis.

The foregoing principles also obtain in the other embodiments of the invention. For example, assume that the filters 17 and 19 of FIG. 3 depict the graded filters of the embodiment which employs two orthogonally related filters and a third ungraded filter. One type corrective signal is then derived from the output of a first graded filter, such as either filter 17 or 19, and an ungraded filter capable of uniform output corresponding to the 0° or center level. The other type corrective signal is obtained from a second graded filter having its sensitive axis orthogonal to that of the first; using the ungraded filter as a common reference.

The output of one of the graded filters is $$P(Mx+D)=S_1$$

The output of the ungraded filter is $P(D)=S_3$.
Then, solving for $x$:

$$\frac{S_3}{D}=\frac{S_1}{Mx+D}$$

$$Mx+D=\frac{S_1D}{S_3}$$

$$Mx=\left(\frac{S_1D}{S_3}-D\right)$$

$$X=\left(\frac{S_1D}{S_3M}-\frac{D}{M}\right)=\left(\frac{S_1}{S_3}-1\right)\frac{D}{M}$$

Similarly, the yaw output correction ($y$) is developed from the filter having its sensitive axis orthogonal to the $x$ filter and the reference filter to provide the following:

$$y=\frac{D}{M}\left(\frac{S_2}{S_3}-1\right)$$

The attenuated light from filters 17 and 19 travels through diffusers 26 and 28 and then impinges upon photo-multipliers 25 and 27 for conversion of the light energy to electrical energy. The diffusing elements 26 and 28 are provided to prevent distorting the target return magnitudes by variations in the photomultiplier cathode surface sensitivity, this result being accomplished by in effect smearing the image well over the entire tube cathode surface. The output of the photo-multiplier tubes is a wide band of noise, caused by the ambient light surrounding the target, superimposed with the signal pulses which by virtue of the signal-to-noise power ratio, stand out above the noise. The composite electrical signals are amplified in the respective wide band amplifiers 29 and 31 which preserves the pulse characteristics. From the wide band amplifiers, the pulses are applied to a backscatter discrimination circuit arrangement, generally included within the dotted box 33.

It will be appreciated that the target signal received by the seeker is far weaker than the incident illuminator signal, because the target signal energy undergoes reflective loss from, for example, a low reflective target surface and also undergoes loss due to a diffuse reflective pattern, occasioned by rough surfaces and the like. The laser beam, although highly concentrated, undergoes considerable scattering under normal operating conditions. Then, since the distance between the beam source and the seeker is not always large, because of various flight path geometries, the loss factor for backscatter return and target return can cause the backscatter to be much stronger than the target return.

There is depicted a typical noise and target return in FIGS. 2A and 2B wherein the actual target return is indicated at 35 and 35'. It is this portion of the incident energy which is useful and thus the purpose of the discriminator circuitry 33 is to separate out the target return portion from the backscatter return. In the event the backscatter is so predominate as to obliterate the signal, then the discriminator circuitry 33 gates through the return from the most distant portion of the backscatter. While FIGS. 2A and 2B portray the electrical energy distribution, it will be appreciated that the light energy distribution, from which the electrical picture is derived, is quite similar.

The discrimination function is based upon the use of a fixed delay line, such as shown at 37 in FIG. 1, for one of the channels. The difference between the wave forms of FIGS. 2A and 2B is the 0.1 microsecond delay in the return of FIG. 2B relative to the return of FIG. 2A, as interposed by the delay line 37. A threshold level 41 and 41' is set by biased off transistors or the like, illustrated by the blocks 45 and 47, such that when the delayed or undelayed signal 35 or 35' exceeds the threshold 41 or 41', an output from the threshold detectors 45 and 47 is obtained.

From FIGS. 2A and 2B it can be seen that at time TA the undelayed threshold detector output of FIG. 2A drops out while the delayed output of FIG. 2B remains on. This is the required condition for an output from the NOT AND–AND logic block 51 of FIG. 1. As a matter of fact, this is the only time during the operation of the circuitry with the wave forms of FIGS. 2A and 2B this condition obtains to permit an output from the logic block 51. It should, however, be noted that in the absence of target return signals the same condition may be brought about by the backscatter return upon similar delay and comparison thereby permitting the missile to home on the most remote backscatter energy.

In any event, the output of logic circuit 51 appears on common lead 53 and branch leads 55 and 57 to open signal gate 61 for channel 1 and signal gate 63 for channel 2. It should be noted that the input energy for channel 1 has also been delayed 0.1 micro second by delay line 65 in order that the outputs from the gates 61 and 63 occur co-incidentally.

During the time TA–TB the target return signal passes through to a position detection or computing circuit including a resistive summing network 71 and a resistive subtracting network 73. Of course when time TB is reached neither the delayed nor undelayed threshold detector 45 or 47 have an output and the logic block condition is no longer set, which closes the signal channel gates 61 and 63, to terminate position measurement at the end of a given target return.

In this manner the backscatter is ignored and the target signal is used for magnitude comparison purposes. However, as was mentioned, when extremely difficult environmental conditions obtain, such that the target return becomes non-essential compared to backscatter, then the seeker homes on the most distant backscatter portion of the beam, in the above described manner to follow this point in a pursuit course to the target; thus, still resulting in a successful flight. This feature of the invention points out one significant advantage over a centroid homing system which is unable to discriminate against backscatter as the centroid moves backward to the illuminator during homing maneuvers.

The resistive summing or comparing networks 71 and 73 operate upon the magnitudes of the two channel position modulated signals, providing sum and difference outputs. The position of the target relative to the orthogonal axes is then obtained by taking the ratio of these sum and difference outputs at ratio detector 75. The ratio detector 75, which is a dividing network, produces zero output for a target on boresight and a positive and a negative output for targets to the right and left of the graded filter sensitive axis, as illustrated in FIG. 3.

The output of the ratio detector 75 is applied to a resolver network 77, consisting of sine and co-sine potentiometers for resolution from the graded filter sensitive axis to missile pitch and yaw co-ordinates. The resolver potentiometers are driven by the same motor 81, over the common connection (dotted line 23) that orients the graded filters 17 and 19. Thus, the same process is repeated for the next pulse of reflected light with the common filter axis stepped forward by 90° to provide orthogonal co-ordinate information, thereby completing the pitch and yaw output corrective signals from resolver 77.

A further feature of the invention resides in an automatic gain control loop or arrangement which insures that the amplitude ratio of the modulated pulses is not distorted after they pass through the graded filters.

This loop consists of a noise detector and filter 121 for channel 1 which receives signal and noise energy from the wide band amplifier and rectifies the noise content. For all practical purposes the signal is small relative to the noise energy, the noise existing approximately $5 \times 10^5$ as often as a pulse.

The detected and filtered output for channel 1 is applied to a differential amplifier 123 along with a reference voltage derived from the reference generator 125. The generator 125 is supplied with the sum output of the signal magnitudes from the channels but includes a threshold limiter to maintain the reference voltage constant under remote approach conditions.

The differential comparison of the signal from the reference generator 125 and the filtered and rectified D.C. level from the noise detector and filter 121 generates a control voltage fed back to the photo-multiplier 25.

Channel 2 uses the same type feed back arrangement including noise detector and filter 127, differential amplifier 129 and a lead 131 extending to reference generator 125.

If the ambient light input to both photo-multipliers is the same, then varying the gain to cause equal noise outputs causes both channels to have an equal gain, dark current noise being far below the ambient photon noise and therefore not a factor in gain adjustment.

The reference voltage from generator 125 is a fixed value so long as the sum of the pulse amplitudes is small, which allows the signal channels to operate at as high a gain as ambient conditions will allow so as to cause early acquisition of the weak return pulses. As the missile closes in on the target the return pulses become stronger and when the sum of these pulses has an output from summing circuit 71 exceeding the pre-set threshold fed into the reference generator 125, the reference output is lowered a proportional amount, reducing the gain of both channels. This action keeps the strong returns from saturating the photo-multipliers and pulse amplifiers.

As was mentioned, the graded filters 17 and 19 are rotated $(360 \times N + 90)$ degrees per pulse period with N being equal to 1 or more to cause the ambient input to both channels to be the same, when integrated over one pulse repetition period of time.

It therefore may be appreciated that the time constant of the automatic gain control loop is approximately that of the pulse repetition period of, for example, 50 milliseconds for a 20 pulse per second system.

It has previously been mentioned that the principle of the invention includes the use of three or more channels to provide both pitch and yaw information from a single light pulse.

It should also be pointed out that a variation of the invention which enhances counter measure immunity includes the use of a clock for rendering the receiver receptive only when a pulse is expected. For self-contained missile systems, the clock is of course synchronized with the pulse emitter prior to dispatch.

While the invention has been explained in detail in connection with its application to a preferred use, nevertheless it will be appreciated that the principles obtaining will immediately suggest other uses to those skilled in the art, and thus the invention is intended to be limited only by the scope of the appended claims, wherein what is claimed is:

1. Apparatus for deriving target positional information in response to light reflected from a target area, comprising in combination a plurality of light conveying paths, filter means in each path having different light transmissive characteristics to light directed thereon, means in each path for converting light energy to electrical energy, discriminating means for selecting out of the electrical energy of each path a portion thereof developed as a result of reflected light from the target area, and means for combining the so-selected portions of electrical energy to provide target positional information.

2. Apparatus for developing positional information in response to light reflected from an object area, comprising in combination a plurality of light conveying paths, graded filter means in each path having different related light transmissive characteristics to light directed thereon, means in each path for converting light energy to electrical energy, discriminating means for selecting out of the electrical energy of at least certain of the paths a portion thereof developed as a result of reflected light from the object area, and means operable from the magnitudes of the so-selected portions of electrical energy to provide positional information.

3. Apparatus for deriving target positional information in response to light reflected from a target area, comprising in combination a plurality of light conveying paths, filter means in each path having different related light transmissive characteristics to light directed thereon, at least two of said filter means having differently oriented sensitive axes, means in each path for converting light energy to electrical energy, discriminating means for selecting out of the electrical energy of at least the paths including the filter means with differently oriented axes a portion thereof developed as a result of reflected light from the target area, and means for combining the so-selected portions of electrical energy to provide target positional information.

4. Apparatus for deriving target positional information in response to light reflected from a target area, comprising in combination a plurality of light conveying paths, a plurality of light transmissive elements disposed respectively in the paths, said plurality of elements including at least two graded light filters characterized by sensitive axes oriented at an angle in excess of 90°, means for converting light energy passed by said elements to electrical energy, discriminating means for selecting out of the electrical energy converted from light energy passed by the filters a portion thereof developed as a result of reflected light from the object area, and means for combining the so-selected portions of electrical energy to derive target positional signals.

5. The apparatus of claim 4 including only two light conveying paths and two elements wherein said sensitive axes are oriented oppositely, and including means for turning the elements for deriving further positional information from further light energy.

6. The apparatus of claim 4 wherein the light filters are confined to two with oppositely oriented sensitive axes, including means for receiving light pulses from the target for distribution to the paths, and means for rotating the filters together at a speed of $(R+\frac{1}{4})N$ where N is equal to the pulse repetition rate and R is the number of completed revolutions between pulses.

7. The apparatus of claim 4 wherein the filters include two with sensitive axes oriented perpendicularly and one with no sensitive axis but capable of uniform light attenuation.

8. The apparatus of claim 4 wherein the light filters include three with their sensitive axes oriented at 120° separations.

9. Apparatus for deriving target positional information in response to light reflected from a target area comprising in combination a plurality of light conveying paths, graded filter elements in each path having different related light transmissive characteristics to light directed thereon, at least two of said filter elements having differently oriented sensitive axes, means in each path for converting light energy to electrical energy, discriminating means for selecting out of the electrical energy of those paths including said two elements a portion thereof developed as a result of reflected light from the target area, said discriminating means including means for delaying the energy in those paths, means for comparing the magnitude of the undelayed energy to the delayed energy, and means for selecting and passing the energy only when the magnitude of the delayed energy resulting from the remotest target area return exceeds a predetermined level and the corresponding undelayed energy magnitude does not, and means for combining the so-selected and passed energy to provide target positional information.

10. Apparatus for deriving target yaw and pitch positional information relative to orthogonal axes in response to received light pulses reflected from a target area comprising in combination a plurality of light conveying paths for the received light, a plurality of light transmissive elements disposed respectively in the paths to yield light magnitude passage in proportion to positional displacement of received light from the orthogonal axes, said plurality of elements including at least two graded light filters characterized by sensitive axes oriented at an angle in excess of 90° to provide pitch and yaw measures respectively, means for converting light energy passed by said elements to electrical energy, discriminating means for selecting out of the electrical energy converted from light energy passed by the filters a portion thereof developed as a result of reflected light from the object area, and means for combining the so-selected portions of electrical energy by magnitude to derive target positional signals as yaw and pitch correctional signals.

11. Homing apparatus responsive to light reflected from an object area comprising in combination means for splitting the reflected light into two paths, variable density filter means in each path having different related light transmissive characteristics for passing a portion of the light directed thereon, means responsive to the portion of light in each of the paths for converting the light energy to electrical energy, discriminating means for selecting out of the electrical energy of each path the portion thereof developed as a result of reflected light from the object area, and means for combining the so-selected portions of electrical energy to provide homing signal outputs.

12. Apparatus for developing output signals indicative of a co-ordinate position of received light comprising in combination means for splitting the received light into a plurality of paths, means respectively disposed in each path having opposite light transmissive characteristics along axes thereof, means for converting the light in each path to electrical signal energy, and means for combining the signal energy to obtain a co-ordinate measure of the light signal relative to the axes of the means having opposite light transmissive characteristics.

13. Apparatus for developing output signals indicative of a co-ordinate position of received light comprising in combination means for splitting the received light into a plurality of paths, means respectively disposed in each path for variably attenuating the light in each path proportionally to the distance along the orthogonal axes, means for converting the attenuated light in each path to electrical signal energy, and means for combining the signal energy to obtain a co-ordinate measure of the received light signal relative to the axes of the means having different light transmissive characteristics.

14. The apparatus of claim 13, wherein the last mentioned means includes a computer for handling and resolving the expression $a-b/a+b$ where $a$ is signal magnitude of one path and $b$ is signal magnitude of a different path.

15. Apparatus for deriving target positional information in response to light reflected from a target area comprising in combination means for receiving light and passing it along at least a pair of paths, at least a pair of linear and oppositely oriented light transmissive elements disposed in the paths respectively, the opposite light transmissive characteristics being along axes at 180° to each other, means for converting light energy which passes the transmissive elements into electrical energy, means for separating out the electrical energy produced by light from the target area in each path, means for combining the signal energy from said paths to determine one of pitch and yaw, and means for rotating the axes of the transmissive elements a multiple of 90° in like direction to permit development of a measure of the other of pitch and yaw.

16. Apparatus for developing pitch and yaw co-ordinate measure relative to orthogonal axes in response to light reflected from a target area comprising in combination means for receiving said light and passing it along a plurality of paths, a linear light transmissive element disposed in each path, the elements effective for each axis having opposite light transmissive characteristics along such axis, means for converting light energy which passes the transmissive elements into electrical energy, means for separating out the electrical energy produced by light from the target area in each path, means for combining the signal energy from said paths to determine one of pitch and yaw; and means for orienting the axis of the transmissive elements a multiple of 90° in like direction to determine the other of pitch and yaw.

17. Apparatus for deriving target positional information in response to light pulses reflected from a target area including light backscatter noise comprising in combination a plurality of light conveying paths, a plurality of light transmissive elements disposed respectively in the paths, said plurality of elements including at least two graded light filters characterized by sensitive axes oriented at an angle in excess of 90°, photo multiplier means for converting light energy passed by said elements to electrical energy, reference generator means for supplying a reference level of electrical energy, differential amplifier means for each path, means for rectifying the electrical energy of the paths, circuits for connecting the rectified energy of each path to the differential amplifier means thereof in association with the reference level of energy, and circuits for connecting the output of each differential means to its associated converting means to adjust the gain thereof, discriminating means for selecting out of the electrical energy converted from light energy passed by the filters a portion thereof developed as a result of reflected light from the target area, and means for combining the so-selected portions of electrical energy to derive target positional signals.

18. The apparatus of claim 17 including means for decreasing the reference energy level upon increase of energy level of said so-selected portions to reduce gain at the converter means via the associated differential amplifiers.

19. Apparatus for deriving target positional information in response to light pulses reflected from a target area comprising in combination a plurality of light conveying paths, a plurality of light transmissive elements disposed respectively in the paths, said plurality of elements including at least two graded light filters characterized by sensitive axes oriented at an angle in excess of 90°, means for converting light energy passed by said elements to electrical energy, discriminating means for selecting out of the electrical energy converted from light energy passed by the filters a portion thereof developed as a result of reflected light from the target area, and means for combining the so-selected portions of electrical energy as to sum and difference, ratio detector means for receiving the sum and difference and resolver means for receiving the ratio detector output to derive target positional signals as pitch and yaw components.

References Cited by the Examiner

UNITED STATES PATENTS

| 3,084,261 | 4/1963 | Wilson | 250—203 |
| 3,122,644 | 2/1964 | Greenlee et al. | 250—203 |
| 3,194,966 | 7/1965 | Hulett | 250—203 |

RALPH G. NILSON, *Primary Examiner.*

M. ABRAMSON, *Assistant Examiner.*